United States Patent [19]

Palmer

[11] 4,175,812

[45] Nov. 27, 1979

[54] ELECTRICALLY CONDUCTIVE BONDING STRAP FOR CONNECTING MOVABLE PARTS

[75] Inventor: Arlo K. Palmer, Renton, Wash.

[73] Assignee: The United States of America as represented by the Secretary of the Air Force, Washington, D.C.

[21] Appl. No.: 891,873

[22] Filed: Mar. 30, 1978

[51] Int. Cl.[2] .................... H02G 13/00

[52] U.S. Cl. .................... 339/29 R; 174/2

[58] Field of Search .................... 339/19, 28, 29, 222, 339/277; 174/2, 4, 5; 361/218; 244/1 A

[56] References Cited

U.S. PATENT DOCUMENTS

| | | | |
|---|---|---|---|
| 2,129,493 | 9/1938 | Deems | 238/14.13 |
| 2,286,415 | 6/1942 | Hewel | 339/29 B |
| 2,623,918 | 12/1952 | Hartwell | 174/2 |

*Primary Examiner*—Neil Abrams

*Attorney, Agent, or Firm*—Joseph E. Rusz; Henry S. Miller

[57] ABSTRACT

The invention comprises a braided wire having a shaped clip soldered or otherwise connected to each end. The clip is so formed as to follow the shape of a retainer which is designed to secure a rubber weather seal by means of a cable and groove arrangement.

5 Claims, 2 Drawing Figures

FIG. 1
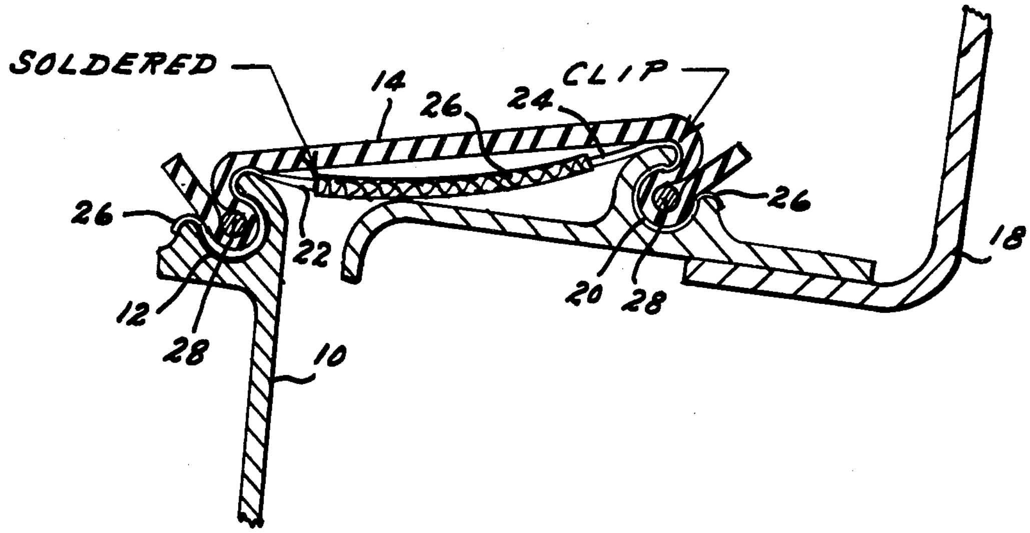
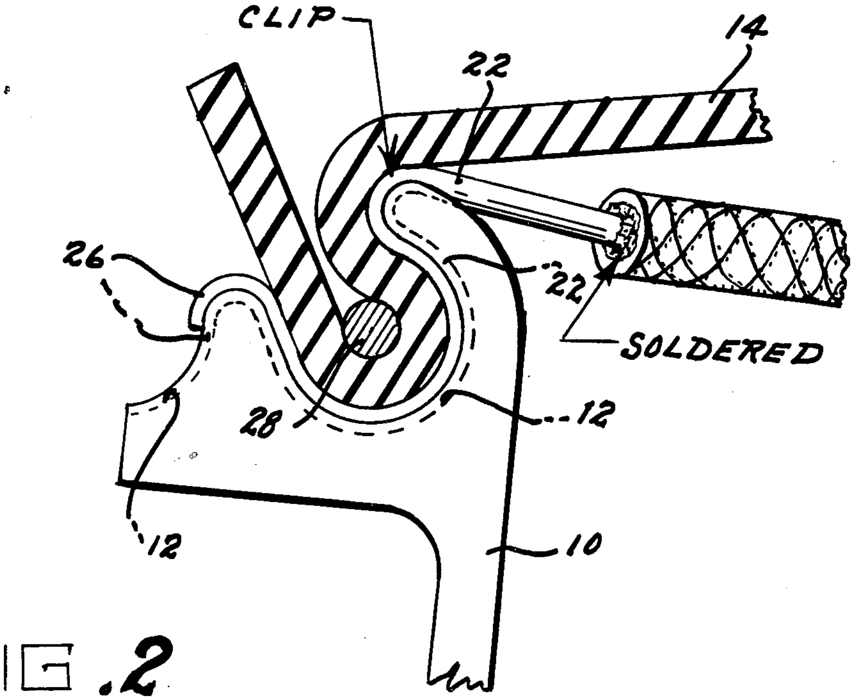
FIG. 2

ELECTRICALLY CONDUCTIVE BONDING STRAP FOR CONNECTING MOVABLE PARTS

STATEMENT OF GOVERNMENT INTEREST

The invention described herein may be manufactured and used by or for the Government for governmental purposes without the payment of any royalty thereon.

BACKGROUND OF THE INVENTION

This invention relates generally to an electrical bonding strap and more particularly to a bonding strap adapted for use between relatively movable objects having weather stripping or other protective material joining the objects.

There exists many instances where it is desirable and necessary to remove electrical charge from the surface of a conductive body. The obvious application of this principle is with the surface panels of aircraft. There are many other devices which build up a charge that are less obvious, including the voltage build up as the result of an electromagnetic pulse created by a large burst of electromagnetic energy released into the atmosphere. This type of surface charge seriously effects operation of communication and navigation equipment in aircraft and must be controlled and discharged as rapidly as possible.

With regard to aircraft, frequently on larger aircraft there is a discontinuity in surface structures where the wing-center section and fuselage bulkhead join. This is a result of the continuous relative movement between the two members, surface panels if connected would rapidly fail because of fatigue. Therefore, surface panels are separated from the bulkhead and joined by a pressure seal which is usually formed from a strong but flexible rubber seal. This seal effectively electrically insulates the wing section from the fuselage and the means for discharge. Hence, it is necessary to provide an electrical bond between the two bodies that will remain secure but flexible under a wide variety of weather extremes and operating conditions.

Several bonding techniques have been advanced ranging from the nut-bolt to welding for attachment of an electrical connector between bodies. These proposed techniques have difficulties which include the lack of reliability and added expense of installation. Additionally, in the event of a malfunction of the bonding device, repair or replacement necessitates the dissassembly of the pressure seal involving a substantial amount of lost flight time for the aircraft.

SUMMARY OF THE INVENTION

The invention involves an electrical bonding strap that will join two relatively movable parts without the need for any accessory securing equipment or welding.

One of the more common methods utilized in securing a flexible pressure or weather seal is to retain the seal in an appropriately shaped groove by means of a cable or rod passing through the groove along its longitudinal axis. The seal material is folded into the groove and then expanded against its inner surface by the cable. The sealing material will easily pass in or out of the groove before it is expanded. Once expanded, it is impossible to be removed without withdrawing the cable first.

The invention provides a braided wire conducting member for spanning the space between the two surfaces (wing and fuselage). Attached, by solder or other appropriate means to the ends of the braided wire are conductive clips. The clips are formed to follow the shape of the seal retainer so that when the seal is secured in place, the clip will be held securely in place against the conductive metal of the seal retaining groove, thereby providing electrical conductivity between two attached parts.

The clips are formed of a high quality spring steel or other suitable materials having sufficient width to prevent the clip from cutting into the seal material.

Clips are installed by simply compressing the annular surface sufficiently to allow them to slip into the retaining groove. Once in the groove, the clip will expand against the inside of the groove and remain stationery until the seal material is put in place, thereby securing the clip in place.

Removal of the clip from the groove is the reverse of the installation process. Once the cable is withdrawn from the groove and seal removed, the clip is compressed by lifting the extending lip and merely taken out through the opening in the groove.

In the event of a seal which is particularly long, a plurality of bonding straps may be used. Where repair or maintainence is required, it is only necessary to withdraw the cable to a point past the clip and then remove only that portion of the seal immediately adjacent the clip on each end and then repair or replace the bonding strap.

It is therefore an object of the invention to provide a new and improved electrical bonding strap.

It is another object of the invention to provide a new and improved electrical bonding stap that is easily installed and maintained.

It is a further object of the invention to provide a new and improved bonding strap that is more reliable than known like devices.

It is still another object of the invention to provide a new and improved bonding strap that will join two relatively moving parts without the need of any accessory securing devices or welding.

It is still a further object of the invention to provide a new and improved electrical bonding strap that is low in cost and conveniently manufactured.

These and other advantages, features and objects of the invention will become more apparent from the following description taken in connection with the illustrative embodiment in the accompanying drawings.

DESCRIPTION OF THE DRAWINGS

FIG. 1 is a side elevation view of the invention installed showing the related pieces in cross-section.

FIG. 2 is an enlarged side elevation view partly in section of the clip installed in the groove.

DESCRIPTION OF THE PREFERRED EMBODIMENT

Referring now to FIGS. 1 and 2, an electrically conductive member 10, which may for example constitute the surface panel of an aircraft wing, has an arcuate-like groove 12 formed along one edge thereof. The groove forms a channel along any desired edge so as to provide a suitable restraint to anchor a weather or other seal 14. The groove is open for approximately 30 degrees and may be of any desired length, cast or extruded with the surface panel.

A second electrically conductive retainer member 16 could be adjustably mounted on an other member such as an aircraft fuselage bulkhead 18. A second arcuate like groove 20 is formed on the surface of the retainer and is generally of the same size, shape and dimension as the corresponding groove located on the adjacent member. The grooves need not be identical although such a feature adds to the simplicity of the invention.

In order to provide a conductive path between members 10 and 16, the invention (bonding strap) is inserted in the grooves (12,20) prior to the seal material 14. Clips 22, 24 are shaped to conform to the internal surface of the groove with a small lip 26 extending exteriorly of the groove to facilitate installation and removal of the clip. The clips are formed of spring metal and have sufficient width to prevent exceptional wear or cutting of the clip into the seal material 14.

Connecting the end clips is a bonding strap 26 which may consist of braided metal conductors which are soldered or otherwise appropriately secured to the clips.

Once installed in the grooves, the end clips are secured by means of the sealing material 14 which is inserted subsequently and restrained by means of cables 28 which are inserted longitudinally in the seal fold and expand the seal material thus securing it in place.

In the event that a long groove is required, perhaps connecting a number of independent panels, then any number of bonding strap assemblies may be utilized by simply snapping them into the appropriate groove.

The shape of the clip will of course depend upon the particular shape of the groove, which is in turn dependent to some degrees upon the nature of the seal material and its use.

Although the invention has been described with reference to a particular embodiment, it will be understood to those skilled in the art that the invention is capable of a variety of alternative embodiments within the spirit and scope of the appended claims.

What is claimed is:

1. A bonding strap assembly located between relatively movable panels having corresponding arcuate grooves and a seal extending between said panels and held securely in said grooves by a means sufficiently large to expand said seal and prevent its removal from the grooves the improvement comprising an elongated electrically conductive means having a first and second connecting means affixed to opposite ends thereof, wherein said connecting means are shaped to conform to the internal surface of said grooves and are held within different ones of said grooves by said means.

2. A bonding strap assembly according to claim 1 wherein said electrically conductive means is a braided wire.

3. A bonding strap assembly according to claim 1 wherein said connecting means is formed of a resilient metal.

4. A bonding strap assembly according to claim 3 wherein said connecting means includes an extension conforming to an external surface of the groove to permit compression of the connector for insertion to and removal from said groove.

5. A bonding strap assembly according to claim 1 wherein the connecting means are connected by means of solder to the electrically conductive means.

* * * * *